(12) United States Patent
Ueno et al.

(10) Patent No.: US 6,739,679 B2
(45) Date of Patent: May 25, 2004

(54) ROLLING WHEEL SUPPORT STRUCTURE FOR CRAWLER TRAVELING APPARATUS

(75) Inventors: Yoshio Ueno, Kishiwada (JP); Masanori Kitano, Yokosuka (JP)

(73) Assignee: Sumitomo Rubber Industries Ltd., Kobe (JP)

(*) Notice: Subject to any disclaimer, the term of this patent is extended or adjusted under 35 U.S.C. 154(b) by 0 days.

(21) Appl. No.: 10/186,920

(22) Filed: Jul. 2, 2002

(65) Prior Publication Data

US 2003/0075979 A1 Apr. 24, 2003

(30) Foreign Application Priority Data

Oct. 22, 2001 (JP) .................................... 2001-324186

(51) Int. Cl.[7] .................... B62D 55/14; B62D 55/00; F16C 13/00
(52) U.S. Cl. .................... 305/138; 305/136; 180/9.5
(58) Field of Search ................. 305/136–138, 305/141–142, 199, 125, 132, 133; 295/7; 301/6.91; 474/273, 903; 180/9.5, 9.52; 74/574; 277/924; 403/220–221, 383

(56) References Cited

U.S. PATENT DOCUMENTS

| | | | | |
|---|---|---|---|---|
| 1,646,427 A | * | 10/1927 | Skidmore, Jr. | 464/32 |
| 2,149,297 A | * | 3/1939 | Knox | 305/132 |
| 2,459,975 A | * | 1/1949 | Swennes et al. | 180/9.62 |
| 3,013,793 A | * | 12/1961 | Howell et al. | 267/153 |
| 3,563,442 A | * | 2/1971 | Kretchman | 277/438 |
| 3,764,184 A | * | 10/1973 | Orr et al. | 305/138 |
| 3,799,625 A | * | 3/1974 | Statz | 305/133 |
| 3,913,987 A | * | 10/1975 | Baldwin et al. | 305/138 |
| 3,985,402 A | * | 10/1976 | Reinsma | 305/138 |
| 4,647,116 A | * | 3/1987 | Trask | 305/138 |
| 4,781,257 A | * | 11/1988 | Gee et al. | 180/9.5 |
| 4,836,318 A | * | 6/1989 | Tonsor et al. | 180/9.5 |
| 5,785,395 A | * | 7/1998 | Crabb | 305/138 |
| 6,129,485 A | * | 10/2000 | Grabe et al. | 405/152 |
| 6,186,694 B1 | * | 2/2001 | Couallier et al. | 403/225 |

FOREIGN PATENT DOCUMENTS

JP       51-42503       3/1976

* cited by examiner

Primary Examiner—S. Joseph Morano
(74) Attorney, Agent, or Firm—Nixon Peabody LLP; David S. Safran

(57) ABSTRACT

A rolling wheel support structure for crawler traveling apparatus includes rotary shafts rotatably supporting rolling wheels which roll on a ground contacting side of an inner circumferential surface of an endless crawler, a track frame supporting the rotary shaft thereon, and a buffer member formed of an elastic material and provided between the track frame and a rotary shaft

9 Claims, 6 Drawing Sheets

ROLLING WHEEL SUPPORT STRUCTURE FOR CRAWLER TRAVELING APPARATUS

BACKGROUND OF THE INVENTION

1. Field of the Invention

This invention relates to a rolling wheel support structure for a crawler traveling apparatus used as traveling apparatus for an agricultural machine, a construction machine or the like.

2. Description of the Prior Art

This kind of crawler traveling apparatus is formed by providing a driving wheel and a driven wheel at front and rear sides of a track frame, a plurality of rolling wheels on a lower portion of the track frame, and wrapping around these wheels a metal crawler provided with a multiplicity of iron shoes on the outer circumferential portions of chain links or an elastic crawler made of an elastic material, such as rubber. This kind of crawler traveling apparatus is designed so as to improve the traveling characteristics thereof with respect to a soft land and a desolate land by increasing an area of the crawler contacting a ground surface to reduce a ground pressure.

Since the crawler traveling apparatus has a high probability of traveling on soft land and desolate land, large vibrations of the traveling apparatus occur due to the irregularity of the ground surface resulting in the problem of the deterioration of riding comfort, Therefore, it is an important problem in the development of crawler traveling apparatus to improve the riding comfort by eliminating the causes of such vibration.

The measures which have heretofore been taken to eliminate the causes of such a vibration include the measures disclosed in, for example, Japanese Unexamined Utility Model Publication No. 42503/1976. These measures use a structure formed by fixing an elastic material, such as rubber, on outer circumferential surfaces of rolling wheels by burning; and then providing protective covers on outer circumferential portions of this elastic material. Owing to this structure, the elastic material provided between an inner circumferential surface of a crawler and the rolling wheels absorbs the vibrations, and the riding comfort can be improved to some extent.

However, in this structure, since the elastic material is provided on the outer circumferential surfaces of the rolling wheels, the protective covers are needed. Even when the protective covers are provided in practice, the occurrence of abrasion and defects of the rolling wheels cannot be avoided since the rolling wheels always roll on the crawler. Moreover, burning of the elastic material on the rolling wheels causes an increase in the manufacturing cost which is a drawback for these techniques.

In view of these problems, it is an object of the present invention to provide a rolling wheel support structure for a crawler traveling apparatus capable of effectively improving the riding comfort of a crawler by properly absorbing the vibration thereof due to the irregularity of a ground surface.

SUMMARY OF THE INVENTION

According to one aspect of the present invention, there is provided a rolling wheel support structure for a crawler traveling apparatus, which includes rotary shafts rotatably supporting rolling wheels that roll on a ground contacting side of an inner circumferential surface of an endless crawler, a track frame supporting the rotary shafts, and a buffer member made of an elastic material and provided between the track frame and a rotary shaft.

According to the above structure, the vibration of the crawler due to the irregularity of the ground surface is properly absorbed in the buffer member provided between the track frame and the rotary shaft, and the riding comfort is improve. Since the buffer members do not directly contact the inner circumferential surface of the endless crawler, deterioration of the buffer member caused by abrasion or the like decreases.

In this structure, it is preferred that the rotary shaft be provided on the track frame so that the rotary shaft can be vertically moved, that a receiving member be provided on the rotary shaft; and that a buffer member be provided between an upper portion of the receiving member and a lower portion of the track frame. This construction provides for a vibration-proof structure for the crawler traveling apparatus that is simple and inexpensive to build.

According to another aspect of the present invention, there is provided a rolling wheel support structure for crawler traveling apparatus which includes a swinging member rotatably supporting a rolling wheel that rolls on an inner circumferential surface of a lower ground contacting side of an endless crawler, a pivot pivotably supporting the swinging member, a track frame supporting the pivot, and a buffer member provided between the track frame and the pivot.

According to the above structure, the vibration of the crawler traveling apparatus due to the irregularity of a ground surface is properly absorbed in the buffer member between the track frame and the pivot such that the riding comfort is improved.

With this structure, it is recommended that the track frame be provided with a cylindrical support member capable of being fitted around the buffer member, and that the buffer member has a cylindrical shape such that the pivot can be fixed into the buffer member such that it is impossible to turn the pivot relative to the buffer member around the axis thereof.

With this structure, the vibration of the crawler can be absorbed in the buffer member while the swinging member is maintained in a pivotable condition.

In this later embodiment, it is preferable that a swinging member fixing shaft is formed to a shape of a square shaft and an inner surface of the buffer member is formed to a shape in conformity with the shaft in cross-section.

Moreover, the buffer member preferably includes larger-diameter portions and smaller-diameter portions which alternate in the axial direction Although the buffer member can be provided for all the rolling wheels, the buffer member may also be provided for only a rolling wheel provided at a front or rear portion of the crawler traveling apparatus, or, correspondingly, be provided to only a rolling wheel located at a longitudinally intermediate position of the crawler traveling apparatus.

When a working machine, such as a combine, is swung, a front or rear portion of a crawler traveling apparatus stands firm, and the machine as a whole swings longitudinally in some cases. However, when the buffer member of the invention is provided in a rolling wheel positioned at the first portion or rear portion of the crawler traveling apparatus, the swinging phenomenon can be avoided by use of the buffer member. When the buffer member is provided on a rolling wheel at a longitudinally: intermediate position of the crawler traveling apparatus, the rolling wheel can be pressed against the inner circumferential surface of the lower portion of the endless crawler by the buffer member, when by a ground pressure of the longitudinally intermediate portion of the crawler partly increases, and a pivotal or swinging movement of the working machine around the crawler can be carried out smoothly.

BRIEF DESCRIPTION OF THE DRAWINGS

FIG. 4 is a side view showing a modified example of the embodiment of.

Figure 5:
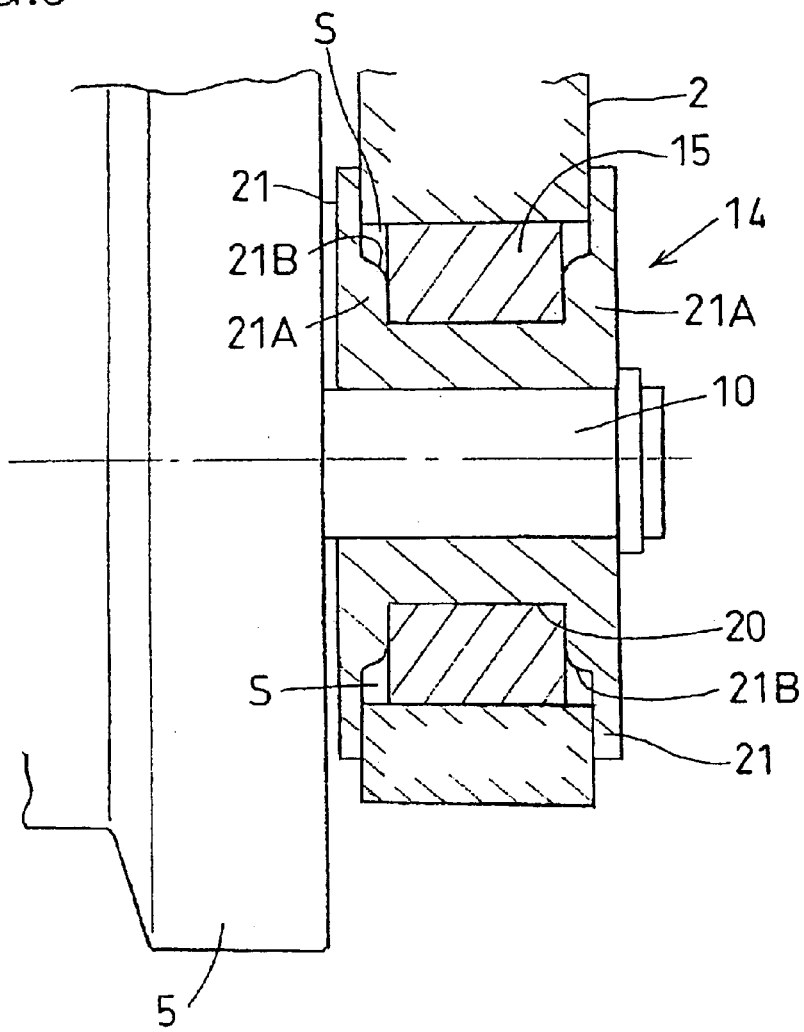
FIG. 5 is a sectioned front view of a rolling wheel support structure according to still another embodiment.
Figure 9:
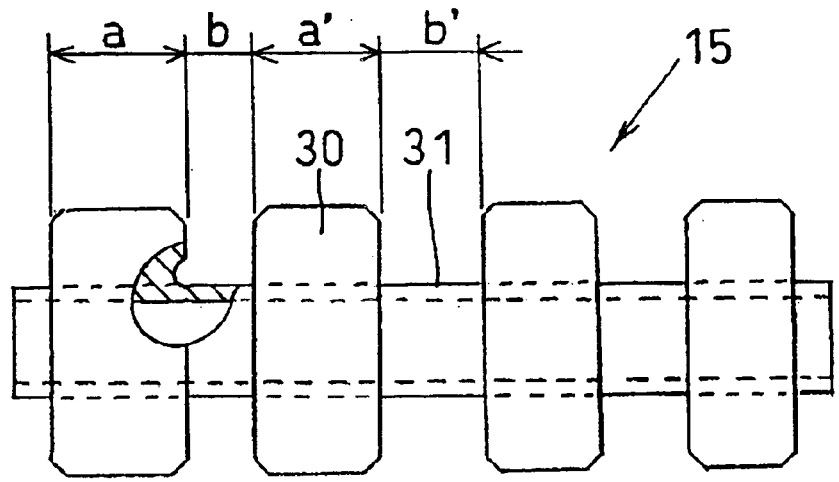
Figure 10:
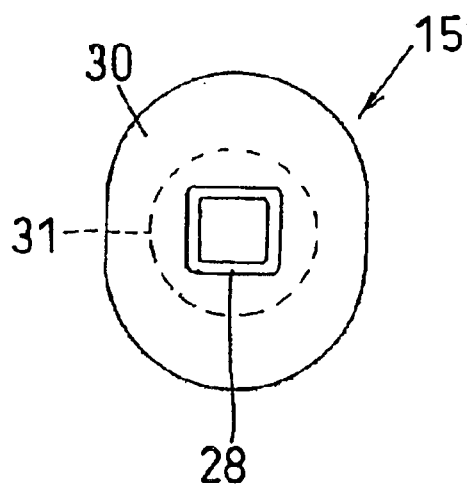
Figure 11:
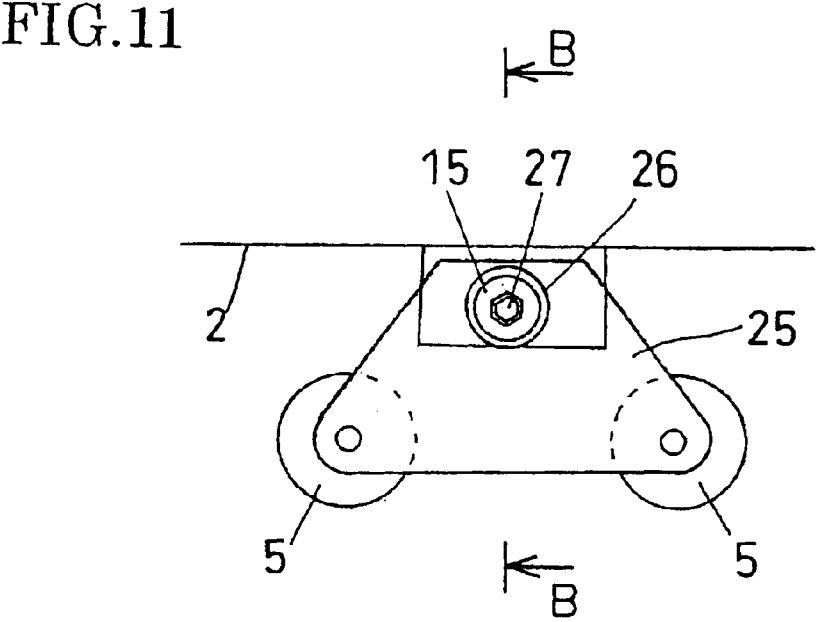
Figure 12:
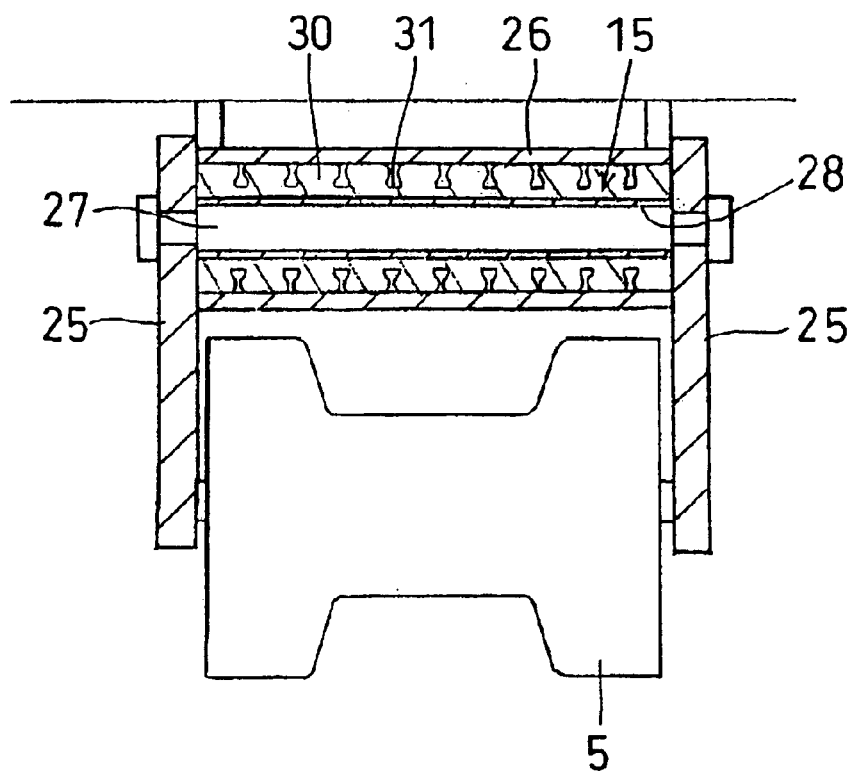
Figure 7:
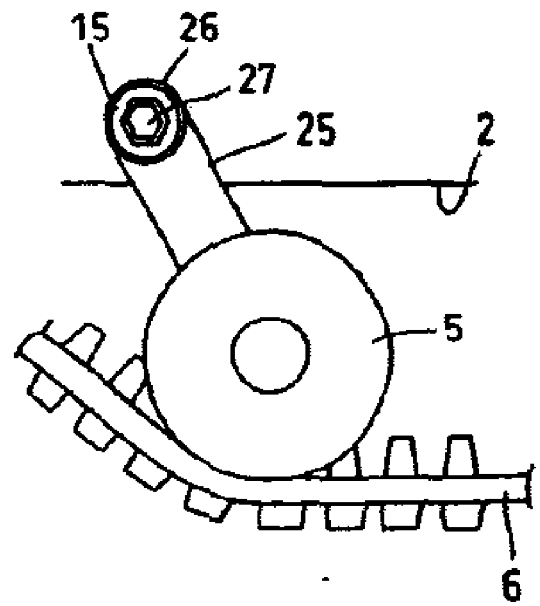
Figure 8:
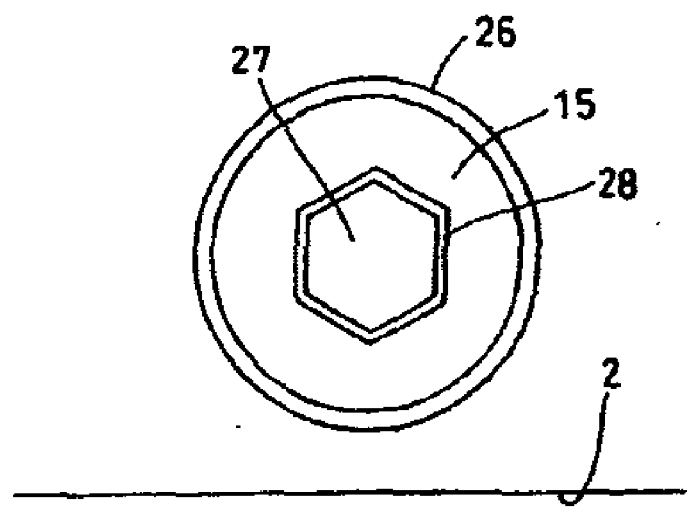

FIG, 8 is a side view of a principal portion of the embodiment of FIG. 5;

FIG. 9 is a front view of a buffer member;

FIG. 10 is a side view showing a buffer member according to another embodiment;

FIG. 11 is a side view of a rolling wheel support structure according to embodiment; and FIG. 12 is a sectional view taken along the line B—B shown with arrows in FIG. 11.

DETAILED DESCRIPTION OF THE INVENTION

The modes of embodiment of the present invention will now be described with reference to the drawings.

Figure 2:
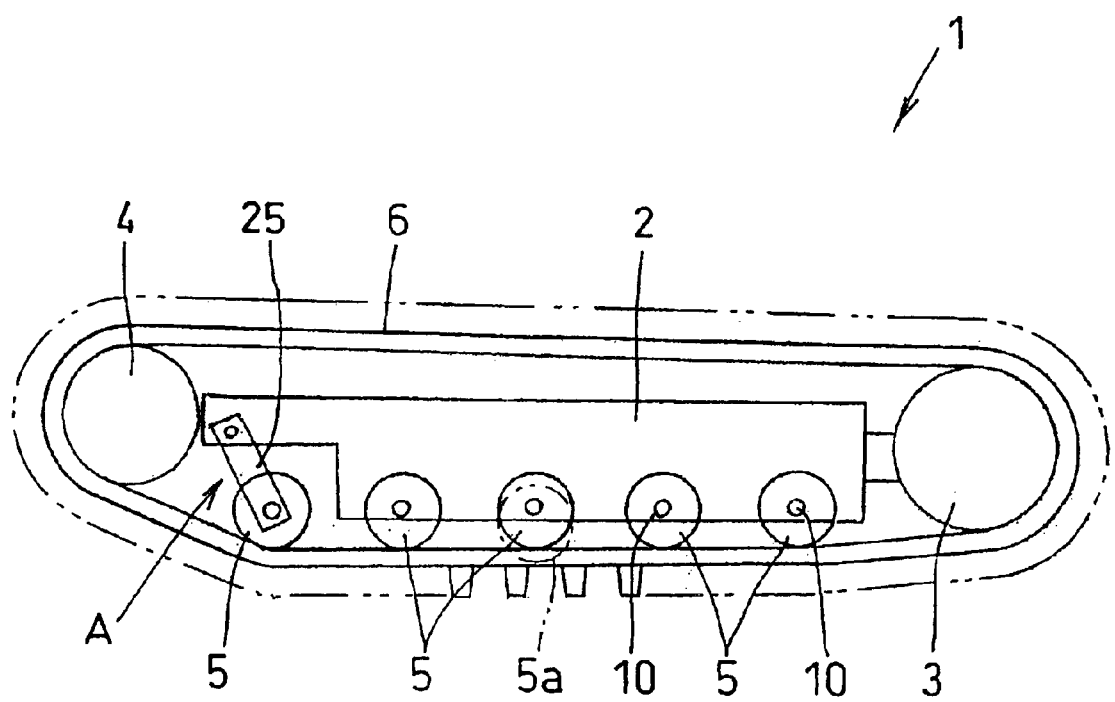
FIG. 2 is a general side view of a crawler traveling apparatus.

FIG. 2 shows a crawler traveling apparatus 1 employing a rolling wheel support structure according to the present invention. The crawler traveling apparatus 1 is formed by providing a driven wheel 3 and a driving wheel 4 at front and rear portion of a track frame 2, and a plurality of rolling wheels 5 positioned on the inner circumferential surface of the lower ground contacting portion of the endless crawler 6 which is wrapped around the rolling wheels 3, 4, 5.

As the crawler 6, a metal crawler having iron shoes fixed on outer surfaces of a plurality of endlessly connected chain links, an elastic crawler endlessly formed out of an elastic material such as rubber, or the like can be employed. crawler 6 is driven by the driving wheel 4 and formed so that the rolling wheels 5 roll on an inner circumferential surface of the lower ground contacting portion of the endless crawler 6.

Figure 1:
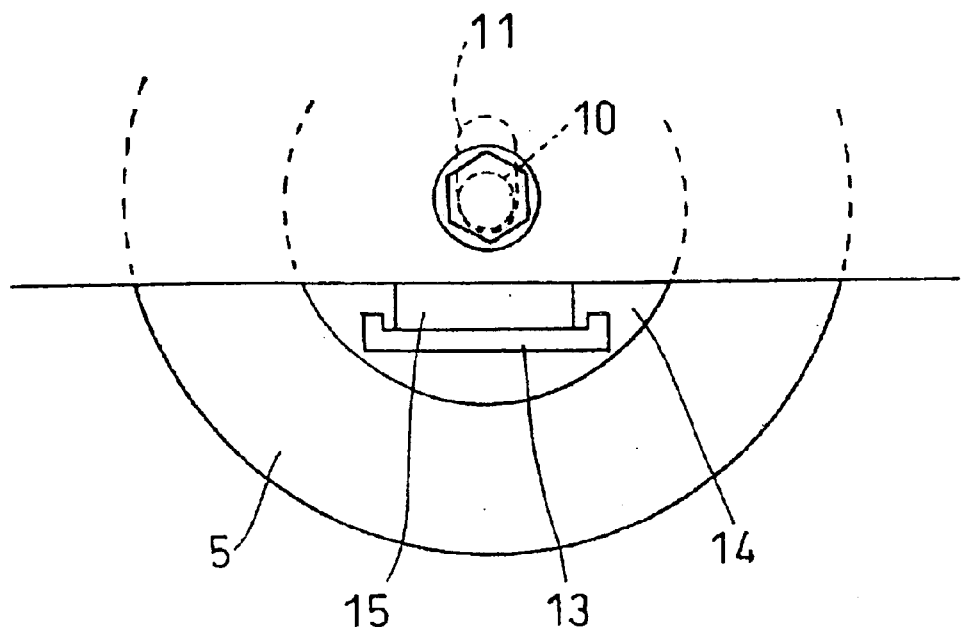
FIG. 1 is a side view of a rolling wheel support structure according to an embodiment of the present invention.

The rolling wheels 5 are supported on the track frame 2 via rotary shafts 10 each of which is inserted in a vertically elongated hole 11, formed in the track frame 2 as shown in FIG. 1, such that the rotary shaft 10 can be vertically moved.

A disc-shaped receiving member 14 having a plate-shaped receiving element 13 is fixed or fitted around the rotary shaft 10 so as to be rotatable about an axis of the rotary shaft 10. Interposed between an upper surface of the receiving element 13 and a lower surface of the track frame 2 is a plate-shaped or block-shaped buffer member 15 formed from an elastic material, such as rubber and urethane resin.

Therefore, the rolling wheel 5 can be moved vertically with respect to the track frame 2, and supported in a vertically elastic state on the buffer member 15.

Consequently, when the crawler traveling apparatus 1 runs on a road surface of a very high irregularity, the vibration of the traveling apparatus is absorbed properly by the buffer member 15, so that the vibration is prevented as much as possible from being transmitted to a worker sitting in a working machine on the crawler traveling apparatus.

Since the buffer member 15 is held compactly around the rotary shaft 10, more specifically, in an area of side projection of the rolling wheel 5, the buffer member 15 does not substantially interfere with other rolling wheels and surrounding parts.

Although it is possible that this buffer member 15 be provided for all the rolling wheels 5, it is also possible that the buffer member 15 be provided for only a certain rolling wheel, for example, a rolling wheel at an intermediate, front, or rear portion of the crawler traveling apparatus 1 with respect to the longitudinal direction thereof.

For example, when the buffer member 15 is provided for the rolling wheel 5a positioned in a longitudinally intermediate portion of the crawler traveling apparatus 1 as shown in FIG. 2, it is preferable that this rolling wheel 5b be disposed slightly lower than the other rolling wheels 5 as shown by a broken line when in a no-load condition (when a reaction force from the ground surface is zero).

This increases the ground pressure of the crawler 6 at a position corresponding to the rolling wheel 5a, thereby facilitating a pivotal or swinging movement of the crawler around this position, and improving the swinging performance of the crawler.

When the buffer member 15 is provided for the rolling wheel 5 positioned at the front or rear portion of the track frame 2, the occurrence of a phenomenon seen in a combine in which a front portion or a rear portion of a crawler traveling apparatus 1 stands firm to cause the machine as a whole to be longitudinally swung when the machine is swung can be avoided. Therefore, the crawler traveling apparatus 1 can be stably swung with a load occurring in the longitudinally intermediate portion thereof.

Figure 3:
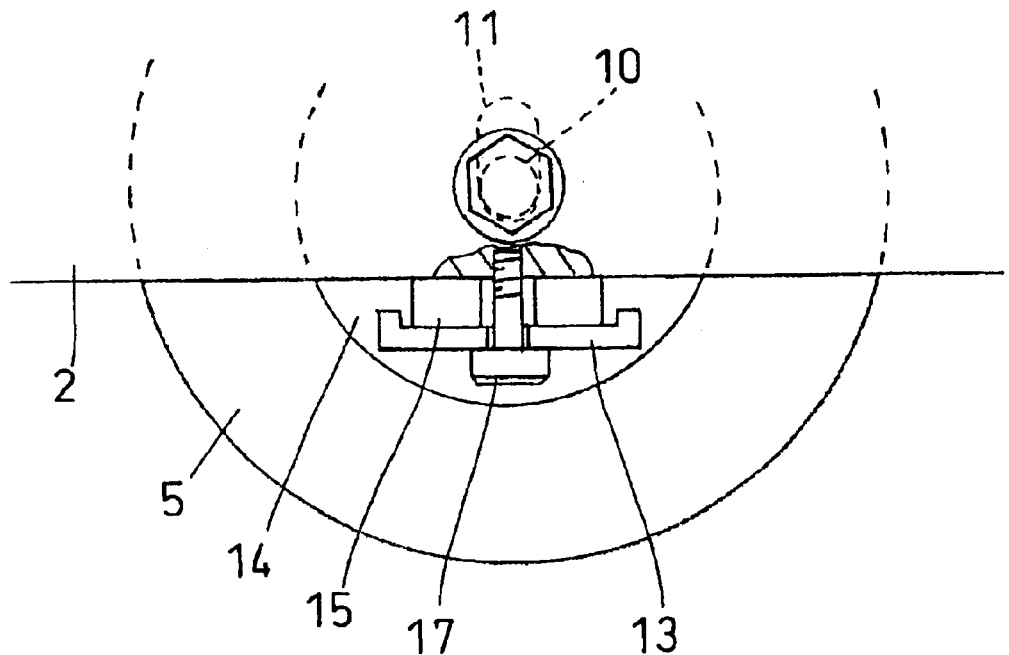
FIG. 3 is a side view of a rolling wheel support structure according to embodiment.

The buffer member 15 may be bonded to the receiving element 13 or the track frame 2, or the buffer member 15 may be positioned by screwing a bolt 17, which is inserted vertically through the receiving element 13 and buffer member 15, to the track frame 2 as shown in FIG. 3. When the latter arrangement is employed, the positioning of the buffer member 15 can be done easily with a vertical movement of the rolling wheel 5 with respect to the track frame 2. Furthermore, the limit to the downward movement of the rolling wheel 5 can be regulated by the bolt 17.

Figure 4:
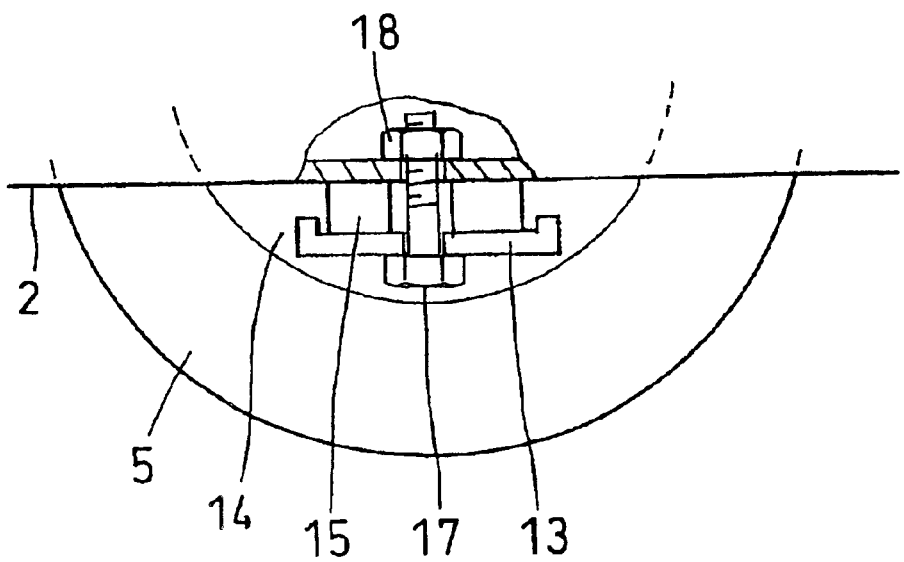

As shown in FIG. 4, the bolt 17 can be provided such that the bolt passes through the track frame 2 from the lower surface thereof, and is fixed by a nut 18 on the inner side of the track frame 2.

FIG. 5 shows another embodiment of the present invention. Specifically, a receiving member 14 includes a cylindrical shaft fixing portion 20 and flange portions 21 radially extending from opposite axial ends of the shaft fixing portion 20. The shaft fixing portion 20 is vertically movably inserted through the track frame 2, and a rotary shaft 10 is inserted through a central portion of the shaft fixing portion 20.

The flange portions 21 are formed with thicker sections 21A adjacent to the junction with the shaft fixing portion 20 such that each thicker section 21A protrudes toward the opposing thicker section 21A. An annular buffer member 15 is provided between the thicker sections 21A of the two flange portions 21. The circumferential edges 21B of the thicker of the thicker sections 21A are formed with rounded or diagonally chamfered In this embodiment, the receiving member 14 can be vertically moved by a distance corresponding to a clearance S between the thicker section 21A of the flange portion 21 and track frame 2. The compression of the buffer member 15 absorbs the vertical movement of the receiving member 14, such that the vibration of a crawler can be absorbed by the assembly.

Since the buffer member 15 is provided on the inner side of the track frame 2 and not exposed to the outside, surrounding parts rarely contact the buffer member 15, and are rarely covered with mud, so that the early deterioration of the buffer member 15 can be prevented.

Since outer circumferential edges of the thicker sections 21A are chamfered, even when the compressed buffer member 15 bulges into the clearance S and is pressed onto the edges of the thicker sections 21A, the buffer member 15 is prevented from being damaged.

Figure 6:
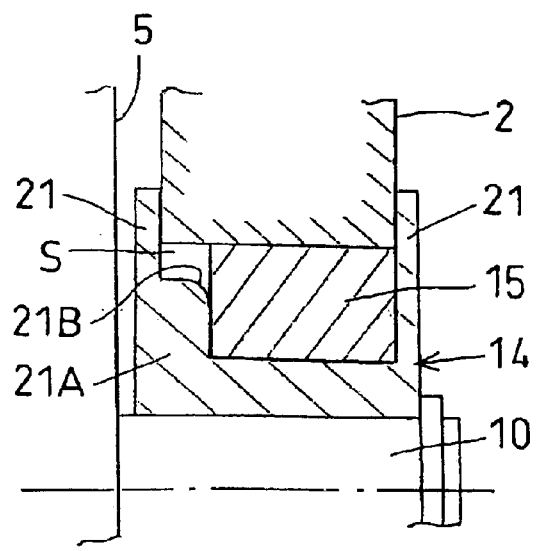
FIG. 6 is a sectioned front view of a principal portion of a modified example of the embodiment of FIG. 5.
Figure 7:
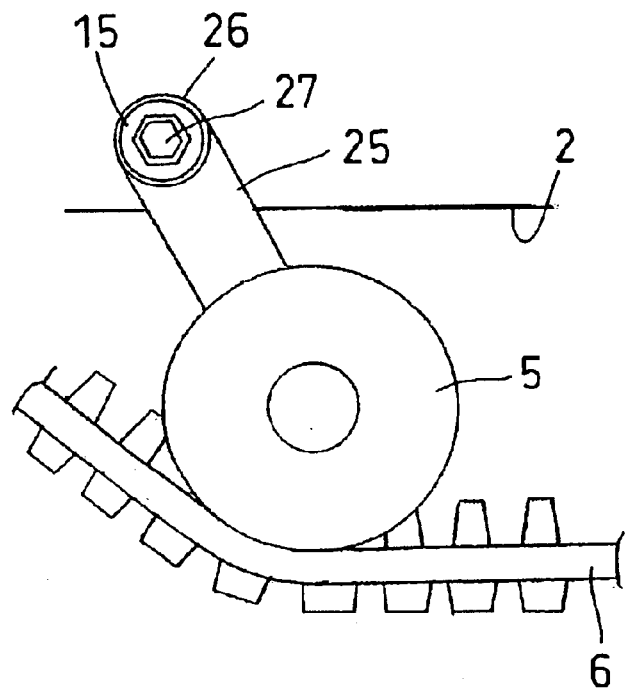
FIG. 7 is a side view of a rolling wheel support structure according to stillanother embodiment.
Figure 8:
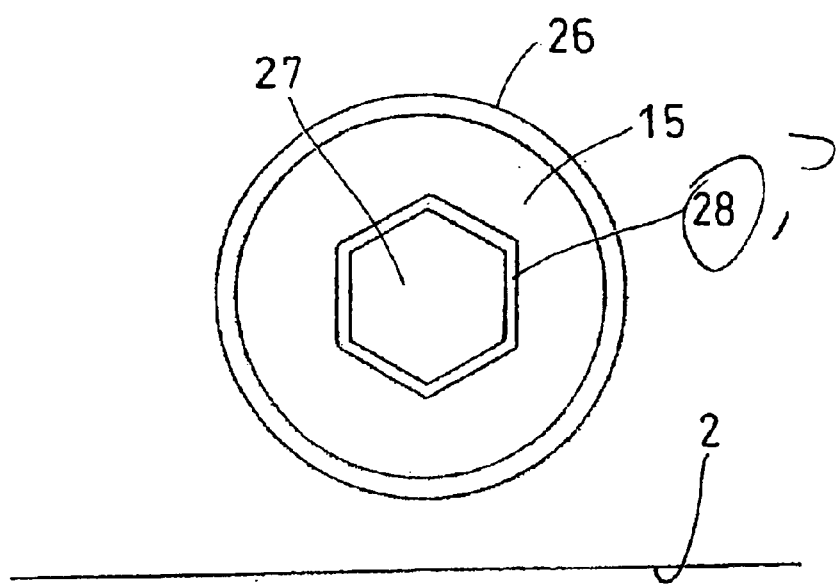

As shown in FIG. 6, the thicker section 21A may be formed on only one of the flange portions 21. In this embodiment, the thicker section 21A is preferably formed to be slightly thicker than the thicker sections in the above-described embodiment. It is also preferable that an outer circumferential edge of the thicker section 21A be formed with a chamfered surface 21B as in the previous embodiment FIGS. 7 and 8 show still another embodiment of the present invention.

In this embodiment, also shown in section A of FIG. 2, there is provided a pivotably mounted swinging member 25 affixed to a track frame 2 which has a rolling wheel 5 attached to the swinging member 25. FIGS. 7 and 8 illustrate the buffer member 15 provided between the swinging member 25 and track frame 2.

More specifically, the track frame 2 is provided with a cylindrically shaped support member 26 extending in the lateral direction, a cylindrically shaped buffer member 15 is fitted into the support member 26, and a pivot 27 of the swinging member 25 is fitted relatively non-rotatably into the buffer member 15.

The buffer member 15 is provided on the inner circumferential surface thereof with an angled cylinder 28, which in this embodiment is formed, for example, as a hexagonally-shaped cylinder. Further, the pivot 27 of the swinging member 25 is formed as an angled shaft (i.e., as a hexagonal shaft in the illustrated example) the shape of which is substantially identical with that of the angled cylinder 28 so that the pivot 27 is fitted relatively non-rotatably in the angled cylinder 28 for the buffer member 15. The angled cylinder 28 is preferably formed of a material such as a metal or a reinforced plastic.

The buffer member 15 is formed to have an outer diameter slightly larger than an inner diameter of the support member 26, and is press-fitted into the support member 26 so that a relative turning movement does not occur between the buffer member 15 and the support member 26.

Therefore, the swinging member 25 can be turned in the range of torsion of the buffer member 15. When the crawler traveling apparatus runs on a road surface having a high degree of irregularity, the vibration of the traveling apparatus is properly absorbed owing to the compression of the buffer member 15, and the riding comfort becomes excellent.

Since the buffer member 15 is compactly provided around the pivot 27 of the swinging member 25, a substantially large space for providing the buffer member 15 is not needed.

As shown in FIG. 9, the buffer member 15 can be formed so as to have larger-diameter portions 30 and smaller-diameter portions 31 arranged alternately in the axial direction thereof. In this case, the buffer member 15 can be compressed greatly in the radial direction. Accordingly, an increase in the buffering effect can be expected, and a heat dissipating performance becomes excellent.

The lengths a, b, a', b' of the larger-diameter portions 30 and smaller-diameter portions 31 can be set unequal with respect to the axial direction in accordance with a desired compressibiliiy and use of the buffer member. Moreover, a transition portion between a larger-diameter portion 30 and a smaller-diameter portion 31, and an outer circumferential edge of a larger-diameter portion 30 are rounded or tapered so as to prevent damage to these portions, including the occurrence of cracks therein.

The contour of the buffer member 15 (that is, the contour of the larger-diameter portions 30 of a buffer member 15 having larger-diameter portions 30 and smaller-diameter portions 31) may be formed into an elliptic shape or an oval shape, as shown in FIG. 10, in order to increase the pressure of the buffer member 15 on the inner surface of the cylindrical support member 26 when the buffer member 15 is press-fitted in the support member 26. This will prevent relative rotation of the buffer member and cylindrical support member 26. The buffer member 15 may also be bonded to an inner surface of the cylindrical support member 26 with a bonding agent so that the buffer member cannot be rotated relative to the support member 26. In the example shown in FIG. 10, the interior of the buffer member 15 is a cylinder having a square hollow cross-section similar to the square cross-section of the cylinder 28.

In still another embodiment, two swinging members 25 may also be provided in a bifurcated state on one pivot 27.

FIGS. 11 and 12 show another embodiment of the present invention. A swinging member 25 in this embodiment is pivotably supported on a track frame 2 while also supporting two rolling wheels 5 at a lower portion therof. Since the swinging member 25 makes a seesaw movement when following a greatly irregular road surface, the dislocation of the rolling wheel 5 from the endless crawler 6 is prevented In this later embodiment, a cylindrical support member 26 is fixed to a lower surface of the track frame 2, a buffer member 15 is fitted into the support member 26, and a pivot 27 of the swinging member 25 is inserted into the buffer member 15. The buffer member 15 is formed with larger-diameter portions 30 and smaller-diameter portion 31 arranged in an alternating axial manner in a manner as shown in the embodiment of FIG 9.

The embodiment of FIGS. 11 and 12 has substantially the same operation and effect as the above-described embodiment of FIGS. 7 and 8. The present invention is not limited to each of the above-described embodiments, and the design of the embodiments can be suitably modified. For example, the rolling wheels 5 may be straddle rolling wheels which roll astride guide projections provided on the inner circumferential surface of the endless crawler 16, or intermediate rolling wheels which roll between a pair of guide projections. The rolling wheels 5 may be supported with respect to the track frame 2 in a center impeller type mode or in a cantilever type mode.

According to the present invention described in detail above, the vibration of the crawler traveling apparatus can be absorbed properly owing to the buffer member provided between the track frame and the rolling wheels, so that the riding comfort can be improved.

What is claimed is:

1. A rolling wheel support structure for a crawler traveling apparatus including an endless crawler having an inner circumferential surface and an outer ground contacting circumferential surface, comprising:
   - rotary shafts rotatably supporting rolling wheels which roll on the inner circumferential surface of the endless crawler;
   - a track frame supporting the rotary shafts;
   - a receiving member, disposed on each of said rotary shafts, between the track frame and the rotary shaft; and
   - a buffer member formed of an elastic material and provided between the receiving member and the track frame so as to circumferentially surround the receiving member and the rotary shaft.

2. A rolling wheel support structure for a crawler traveling apparatus according to claim 1, wherein each rotary shaft is vertically movably provided on the track frame.

3. A rolling wheel support structure for a crawler traveling apparatus according to claim 1, further comprising:
   - a swinging member rotatably supporting the rolling wheels which roll on the inner circumferential surface of the endless crawler;
   - a pivot pivotally supporting the swinging member; and
   - a second buffer member formed of an elastic material and provided between the track frame and the pivot,
   - wherein the pivot is supported by the track frame.

4. A rolling wheel support structure for a crawler traveling apparatus according to claim 3, wherein the track frame is provided with a cylindrical support member capable of being fitted around the second buffer member, the second buffer member having a cylindrical shape in which the pivot can be held non-rotatably relative to the second buffer member around an axis of the pivot.

5. A rolling wheel support structure for a crawler traveling apparatus according to claim 4, wherein the second buffer member has an inner surface formed into a square or hexagonal tubular, and the pivot is formed into a square or hexagonal shape having a cross-section in conformity with that of the tubular inner surface of the second buffer member.

6. A rolling wheel support structure for a crawler traveling apparatus according to claim 4, wherein at least one of the buffer member and the second buffer member comprises larger-diameter portions and smaller-diameter portions arranged alternately in the axial direction of the rotary shaft.

7. A rolling wheel support structure for a crawler traveling apparatus according to claim 5, wherein at least one of the buffer member and the second buffer member comprises larger-diameter portions and smaller-diameter portions arranged alternately in the axial direction of the rotary shaft.

8. A rolling wheel support structure for a crawler traveling apparatus according to any one of claims 1 to 6, wherein at least one of the buffer member or the second buffer member is provided for a rolling wheel positioned at a front portion or a rear portion of the endless crawler of a crawler traveling apparatus.

9. A rolling wheel support structure for a crawler traveling apparatus according to any one of claims 1 to 6, wherein the buffer member is provided to a rolling wheel positioned in a longitudinally intermediate portion of the endless crawler off a crawler traveling apparatus.

* * * * *

UNITED STATES PATENT AND TRADEMARK OFFICE
CERTIFICATE OF CORRECTION

PATENT NO. : 6,739,679 B2
DATED : May 25, 2004
INVENTOR(S) : Yoshio Ueno and Masanori Kitano It is certified that error appears in the above-identified patent and that said Letters Patent is hereby corrected as shown below:

Drawings,
Figures 7 and 8, should be shown as attached.

Signed and Sealed this

Seventh Day of June, 2005

JON W. DUDAS
*Director of the United States Patent and Trademark Office*